No. 803,121. PATENTED OCT. 31, 1905.
F. C. MILLER.
REAR AXLE FOR AUTOMOBILES.
APPLICATION FILED APR. 13, 1905.
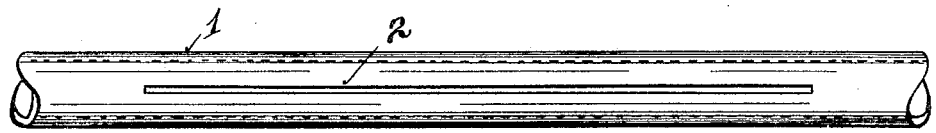
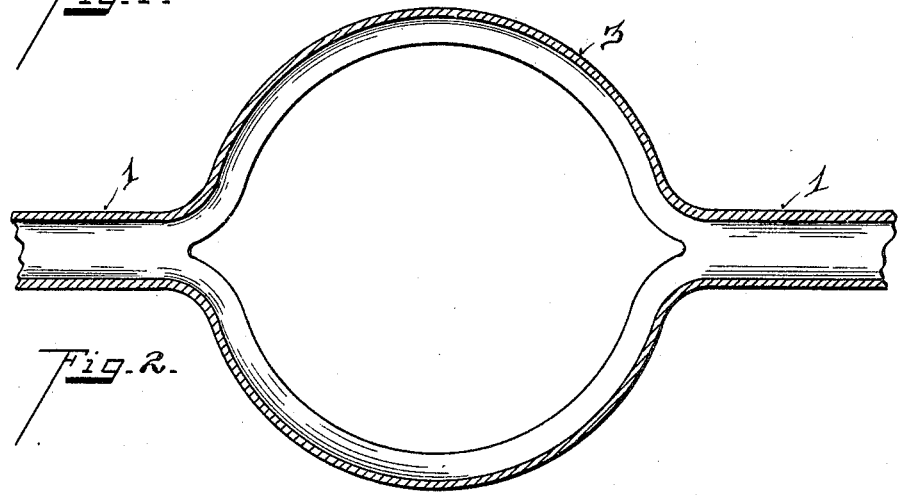
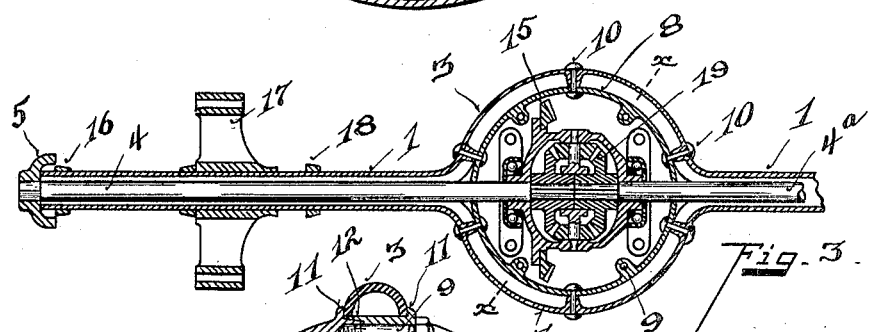
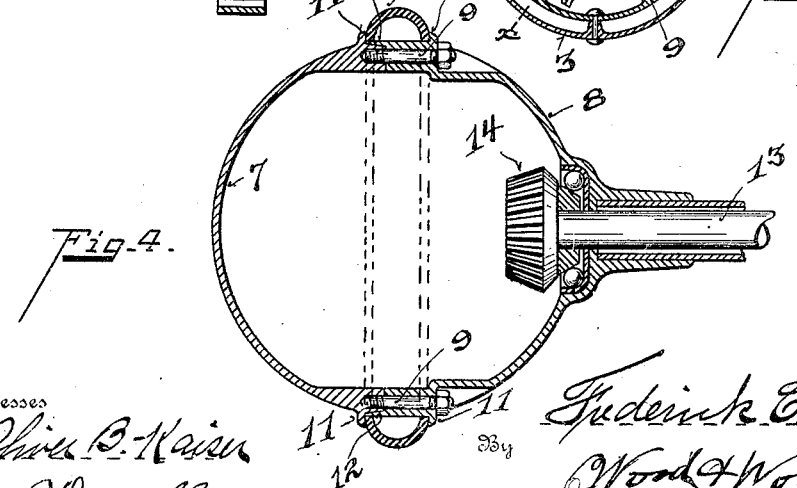

UNITED STATES PATENT OFFICE.

FREDERICK C. MILLER, OF CINCINNATI, OHIO.

REAR AXLE FOR AUTOMOBILES.

No. 803,121.     Specification of Letters Patent.     Patented Oct. 31, 1905.

Application filed April 13, 1905. Serial No. 255,277.

*To all whom it may concern:*

Be it known that I, FREDERICK C. MILLER, a citizen of the United States, residing at Cincinnati, in the county of Hamilton and State of Ohio, have invented certain new and useful Improvements in Rear Axles for Automobiles, of which the following is a specification.

The principal object of this invention is to produce a one-piece rear axle for automobiles where it is desired to drive the wheels without the intervention of a counter-shaft and side chains, either by bevel-gearing or chain and sprocket, and to secure all the strength in the axle secured by the side chains and counter-shaft construction without any of its disadvantages.

The essential feature of the invention is a one-piece tube, preferably of steel, the intermediate portion of which has walls swaged away from the center of the tube, the wheel-shafts being inserted through the ends of the tube and projected between the separated walls, whereby the transmission mechanism may be mounted within the housing formed by said swaged walls. Preferably the transmission mechanism is supported within a suitable casing secured within the housing formed by the divided tube. This one-piece-axle construction and arrangement obviate the use of any brazed or bolted connections with their inherent objections in the load-carrying part of the axle and permits the use of a material of known reliability of strength.

The features of the invention are more fully set forth in the description of the accompanying drawings, forming a part of this specification, in which—

Figure 1 is a plan view of the tube from which the axle is formed. Fig. 2 is a central vertical section of the axle. Fig. 3 is a central vertical section of the intermediate portion and one end of the axle with the shaft and gear-casing assembled. Fig. 4 is a section on line $x\,x$, Fig. 3.

1 represents the tube provided with a diametrical slit 2 in the intermediate portion. The opposite semicylindrical sections of the tube formed by the slit 2 are spread apart by any suitable operation to form a casing support or housing 3, (see Fig. 2,) preferably of circular form, although the shape is not material. The wheels may be journaled upon the opposite ends of the tube axle and secured to the driving-shafts 4 $4^a$ in the opposite ends of the tube by a clutch, such as 5. (See Fig. 3.)

The particular form of the wheel-and-shaft connection is not essential to this invention.

6 represents bolt-holes in the swaged walls.

The gear-casing preferably consists of two semispherical shells 7 8, respectively, secured together by the bolts 9. (See Fig. 4.) The casing 8 is attached to the spread walls 3 of the axle by bolts or rivets 10 or by other suitable means. The semispherical sections of the casing are formed with the flanges 11 (see Fig. 4) engaging upon the opposite edges of the axle-walls 3. The casing-sections have also, preferably, the interlocking meeting edges 12. (See Fig. 4.) Into the casing projects the main transmission-shaft 13 with its bevel-gear 14. The gear-wheel 14 intermeshes with the gear-wheel 15, which transmits motion to the compensating gears 19 and shafts 4 $4^a$.

It is to be understood that the invention is not concerned with the particular type of transmission and compensating mechanism here shown, as it is equally applicable to sprocket wheel and chain or other forms of transmission.

The shafts 4 $4^a$ project through the ends of the tube 1 into the gear-casing between the swaged walls of the support 3. As shown, the wheel journals between the bearing-cone 16 and the brake-support 17, while the springs for securing the axle to the vehicle-body are attached between the support 17 and the collar 18. (See Fig. 3.)

The gear-casing is not relied upon as an element of the axle structure for supporting the load, although its position between the swaged walls of the axle-tube incidentally braces and solidifies the intermediate portion of the axle.

As shown, the swaged walls of the tube axle are semicircular in cross-section; but it is obvious that these walls may be given any shape or design.

Having described my invention, I claim—

1. A rear axle for automobiles, consisting of a tube, the intermediate walls of which are swaged apart from the center of the tube forming a housing, a wheel-shaft projected through the tube into the housing, and a transmission mechanism for the shaft within the housing, substantially as described.

2. A rear axle for automobiles, consisting of a tube, the intermediate walls of which have been slitted and swaged to form a support, a casing attached to the support, transmission mechanism within the casing, and wheel-shafts inserted through the ends of the tube and having a driving engagement with said transmission mechanism, substantially as described.

3. A rear axle for automobiles, consisting of a tube, the intermediate portion of which has been slitted and the walls swaged apart, substantially as described.

4. A rear axle for automobiles, consisting of a tube, having intermediate swaged walls, a gear-casing secured between said walls, wheel-shafts projecting through the ends of the tube and into said gear-casing, substantially as described.

In testimony whereof I have hereunto set my hand.

FREDERICK C. MILLER.

Witnesses:
OLIVER B. KAISER,
LUISE BECK.